US012779971B2

(12) United States Patent
Weindl et al.

(10) Patent No.: US 12,779,971 B2
(45) Date of Patent: Nov. 3, 2026

(54) FUEL CELL ARRANGEMENT IN VEHICLE FRONT STRUCTURE

(71) Applicant: Bayerische Motoren Werke Aktiengesellschaft, Munich (DE)

(72) Inventors: Stefan Weindl, Holzkirchen (DE); Alexander Werner, Markt Indersdorf (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 221 days.

(21) Appl. No.: 18/565,126

(22) PCT Filed: May 19, 2022

(86) PCT No.: PCT/EP2022/063590
§ 371 (c)(1),
(2) Date: Nov. 29, 2023

(87) PCT Pub. No.: WO2022/253580
PCT Pub. Date: Dec. 8, 2022

(65) Prior Publication Data

US 2024/0262178 A1 Aug. 8, 2024

(30) Foreign Application Priority Data

May 31, 2021 (DE) ..................... 10 2021 113 975.9

(51) Int. Cl.
*B60K 1/00* (2006.01)
*B60K 1/04* (2019.01)
(Continued)

(52) U.S. Cl.
CPC ................ *B60K 1/04* (2013.01); *B60L 50/71* (2019.02); *B62D 21/11* (2013.01); *B62D 25/085* (2013.01);
(Continued)

(58) Field of Classification Search
CPC .... B60K 1/04; B60K 1/00; B60K 2001/0411; B60L 50/71; B60L 2210/10; B62D 25/085
See application file for complete search history.

(56) References Cited

U.S. PATENT DOCUMENTS

2005/0224265 A1 10/2005 Mizuno
2007/0039767 A1 2/2007 Kondo
(Continued)

FOREIGN PATENT DOCUMENTS

CN 1659053 A 8/2005
CN 102448752 A 5/2012
(Continued)

OTHER PUBLICATIONS

International Search Report (PCT/ISA/210) issued in PCT Application No. PCT/EP2022/063590 dated Sep. 8, 2022 with English translation (4 pages).
(Continued)

*Primary Examiner* — Jason D Shanske
*Assistant Examiner* — James J Triggs
(74) *Attorney, Agent, or Firm* — Crowell & Moring LLP

(57) ABSTRACT

A front-end vehicle structure includes a bulkhead, a fuel cell system and a DC/DC converter. The DC/DC converter is arranged next to the fuel cell system in a vehicle width direction and at a level of the fuel cell system in a vehicle height direction. The fuel cell system and the DC/DC converter are arranged in front of the bulkhead in a longitudinal direction of the vehicle.

20 Claims, 2 Drawing Sheets

(51) Int. Cl.

| | |
|---|---|
| ***B60L 50/71*** | (2019.01) |
| ***B62D 21/11*** | (2006.01) |
| ***B62D 25/08*** | (2006.01) |

(52) U.S. Cl.

CPC ... *B60K 2001/0411* (2013.01); *B60L 2210/10* (2013.01)

(56) References Cited

U.S. PATENT DOCUMENTS

| | | | | |
|---|---|---|---|---|
| 2011/0193332 | A1* | 8/2011 | Mildner ................. | B62D 25/14 280/781 |
| 2011/0240386 | A1 | 10/2011 | Czinger et al. | |
| 2012/0006607 | A1 | 1/2012 | Ohashi | |
| 2012/0103713 | A1* | 5/2012 | Ohashi ...................... | F16C 3/03 180/68.4 |
| 2016/0297290 | A1 | 10/2016 | Murata et al. | |
| 2020/0070640 | A1 | 3/2020 | Murai | |
| 2020/0086730 | A1* | 3/2020 | Hara ....................... | B60P 1/431 |

FOREIGN PATENT DOCUMENTS

| | | | |
|---|---|---|---|
| CN | 106042878 | A | 10/2016 |
| DE | 10 2016 105 972 | A1 | 10/2016 |
| DE | 11 2009 004 800 | B4 | 2/2018 |
| DE | 10 2019 117 114 | A1 | 3/2020 |
| JP | 2009137443 | A | 6/2009 |

OTHER PUBLICATIONS

German-language Written Opinion (PCT/ISA/237) issued in PCT Application No. PCT/EP2022/063590 dated Sep. 8, 2022 with English translation (10 pages).

German-language Search Report issued in German Application No. 10 2021 113 975.9 dated Nov. 24, 2021 with partial English translation (16 pages).

Chinese language Office Action issued in Chinese Application No. 202280037492.4 dated Aug. 18, 2026, with English translation (16 pages).

* cited by examiner

FUEL CELL ARRANGEMENT IN VEHICLE FRONT STRUCTURE

BACKGROUND AND SUMMARY

The disclosure relates to front-end vehicle structure of a motor vehicle, and a motor vehicle having the front-end vehicle structure.

DE 10 2016 105 972 A1 relates to a holding mechanism having: a holding plate which is able to hold an electronic device for an electric vehicle; a leg portion which supports the two long sides of the holding plate; first and second fastening portions which are provided in the leg portion and are mutually spaced apart in a short direction of the holding plate; and a third fastening portion which along the short direction is placed on, or close to, one of two sides of the holding plate, so as to be higher than the first and the second fastening portion, wherein the first and the second fastening portion can in each case be fastened to a first and a second assembly part, the assembly parts being provided in a structural vehicle body element on a front side of the electric vehicle and being mutually spaced apart in a width direction or a front-to-rear direction of the electric vehicle, and wherein the third fastening portion can be fastened to a third assembly part which is provided in the structural vehicle body element.

DE 10 2019 117 114 A1 relates to a vehicle power unit space structure having: a motor which is disposed within a power unit space and is configured in such a manner that the motor transmits a driving force to a drive wheel; a compressor which in a vehicle transverse direction is disposed adjacent to the motor so as to overlap the motor, when viewed along the vehicle transverse direction; and a power supply portion which is configured in such a manner that the latter guides power supplied by a power source toward the motor and the compressor, and which is disposed on an upper vehicle side of the compressor so as to overlap the compressor, when viewed along a vehicle vertical direction.

The object of the present disclosure is based on integrating a fuel cell system into a front-end vehicle structure of a motor vehicle, in particular of an automobile, so as to be optimized in terms of installation space, wherein an installation space available for an electric motor, an aerodynamic drag and crash properties of the motor vehicle are to be optimized in particular, and a weight of a support structure supporting the fuel cell system is to be minimized.

This object is achieved by the features of the independent claim. The dependent claims contain preferred refinements.

Accordingly, the object is achieved by a front-end vehicle structure of a motor vehicle, which has a bulkhead, a fuel cell system, and a DC/DC converter. The DC/DC converter is disposed beside the fuel cell system in a motor vehicle width direction, and is disposed so as to be level with the fuel cell system in a motor vehicle vertical direction. The fuel cell system and the DC/DC converter are disposed in front of the bulkhead in a motor vehicle longitudinal direction.

In other words, provided is a front-end vehicle structure of a motor vehicle, in particular of an automobile, wherein the front-end vehicle structure has a bulkhead or firewall, respectively, which as part of a bodywork of the motor vehicle can separate a passenger cabin from a motor bay of the motor vehicle below a front screen or windshield, respectively. A fuel cell system, or a fuel cell stack, respectively, conjointly with a DC/DC converter, is disposed within this motor bay which in the motor vehicle longitudinal direction is situated closer to a front of the motor vehicle than the bulkhead.

Conventionally, the fuel cell system is typically disposed so as to be offset in relation to the DC/DC converter in the motor vehicle vertical direction, or vertically offset thereto. In this way, the DC/DC converter is disposed above or below the fuel cell system, this in the form of an elevation having a negative effect on a size of the front-end vehicle structure in the motor vehicle vertical direction. As a result of the elevation, and owing to a motor vehicle contour typically having to be raised in the region of a front hood or motor hood, respectively, as a result, the conventional arrangement of the fuel cell system and of the DC/DC converter also has a negative effect on the drag coefficient of the motor vehicle, leading to an increased energy consumption of the motor vehicle and to lower efficiency.

Moreover, as a result of the conventional arrangement of the fuel cell system and of the DC/DC converter, an additional support structure for attaching and mounting the fuel cell system in the motor vehicle is typically required, which requires a relatively large installation space, again in the motor vehicle vertical direction in particular, but also increases a weight of the front-end vehicle structure.

Due to the installation height of the fuel cell system conjointly with the DC/DC converter, an integration of the electric machine, or of the electric motor, respectively, is furthermore restricted, as a result of which only a relatively small electric motor can be integrated in the front end of the vehicle.

In contrast, an arrangement of the fuel cell system and DC/DC converter in which the two components are disposed beside one another in the front end of the vehicle is presently proposed.

This results in an advantage in terms of the dimensional chain in the motor vehicle vertical direction, a flatter motor vehicle contour which results in improved efficiency, and an installation of a comparatively larger and thus more powerful electric machine, being enabled as a result.

The further advantageous design embodiments will be described hereunder.

The DC/DC converter in the motor vehicle longitudinal direction can be disposed so as to be level with the fuel cell system.

The front-end vehicle structure can have two suspension strut domes which are disposed opposite one another in the motor vehicle width direction.

The fuel cell system can be disposed between the suspension strut domes in the motor vehicle width direction, and/or be disposed so as to be level with the suspension strut domes in the motor vehicle longitudinal direction.

Additionally or alternatively, the DC/DC converter can be disposed between the suspension strut domes in the motor vehicle width direction, and/or be disposed so as to be level with the suspension strut domes in the motor vehicle longitudinal direction.

The suspension strut dome can be a reinforced convexity in the wheel arch of an integral bodywork of the motor vehicle, which is reinforced in comparison to the surrounding elements of the bodywork. A bearing for a suspension strut can be situated at an apex of the convexity.

As a result of the above design embodiment, the fuel cell system and the DC/DC converter can be disposed outside a region which lies in front of the suspension strut domes in the vehicle longitudinal direction, and be located in a region between the suspension strut domes which is safe in the event of a crash. It is also contemplated for the electric motor to be disposed in the region between the suspension strut domes.

A housing of the DC/DC converter, conjointly with the fuel cell system, can form a self-supporting structure.

The self-supporting structure can extend over an entire length between the suspension strut domes in the motor vehicle width direction.

A reduction in weight can be achieved in particular by this design embodiment, i.e. by the self-supporting structure.

The front-end vehicle structure can have a fuel cell system periphery which is disposed in front of the fuel cell system and/or the DC/DC converter in the motor vehicle longitudinal direction.

As described above, the fuel cell system and the DC/DC converter can be disposed outside a region which lies in front of the suspension strut domes in the vehicle longitudinal direction, and be located in a region between the suspension strut domes which is safe in the event of a crash. It is contemplated that the fuel cell system periphery, which may be impinged in the crash, is situated in the crash-relevant region, or the region that is deformed in the event of a collision, respectively, in front of the fuel cell system and the DC/DC converter.

The peripheral components, or the fuel cell system periphery, respectively, can in particular be disposed between a cooler and a module consisting of the DC/DC converter and the fuel cell system.

Additionally or alternatively, the peripheral components can be attached directly to the DC/DC converter and/or the fuel cell system, this potentially resulting in a reduction in terms of components and/or weight.

The peripheral components of the fuel cell system can be, for example, a drive apparatus, in particular with a compressor, and/or a control device of the fuel cell system.

The front-end vehicle structure can have an anode system which is disposed in front of the fuel cell system and/or the DC/DC converter in the motor vehicle longitudinal direction.

As a result of this arrangement, the anode system is relatively easy to access from the outside or the front, respectively, this resulting in maintenance work on the anode system being able to be carried out with relatively little complexity.

The fuel cell system and the DC/DC converter can be mounted on the front-end vehicle structure, in particular on one of the suspension strut domes or on both suspension strut domes.

Additionally or alternatively, the front-end vehicle structure can have two longitudinal motor supports which are disposed opposite one another in the motor vehicle width direction. The fuel cell system and the DC/DC converter can be mounted on one of the longitudinal motor supports or on both of the longitudinal motor supports.

The module consisting of the DC/DC converter and the fuel cell system can thus be mounted on the suspension strut domes as well as, additionally or alternatively, on the longitudinal motor supports. The suspension strut domes as well as the longitudinal motor supports are relatively stiff components and therefore enable the module to be acoustically decoupled from the bodywork of the motor vehicle.

The front-end vehicle structure can have an electric motor which in the motor vehicle vertical direction is disposed below the fuel cell system and/or the DC/DC converter.

As described above, a relatively large and thus powerful electric motor can be installed in the front-end vehicle structure as a result of this arrangement.

More specifically, as a result of the design embodiment of the front-end vehicle structure described above, a fuel cell output can be adapted as a function of a length of the front-end vehicle structure without changing the above-described arrangement of the individual components relative to one another, because the fuel cell output is correlated with a number of fuel cells that can be stacked in the motor vehicle longitudinal direction in this arrangement. In this way, shorter and thus less powerful fuel cell systems require a short length in the motor vehicle longitudinal direction than larger and thus more powerful fuel cell systems. In this way, it is possible to adapt a fuel cell system as a function of the respective length of the front-end vehicle structure of a vehicle derivative. As a result, a solution for a modular construction principle of the fuel cell system for different vehicle derivatives can presently be provided.

An embodiment will be described hereunder with reference to the figures.

DETAILED DESCRIPTION OF THE DRAWINGS

Figure 1:
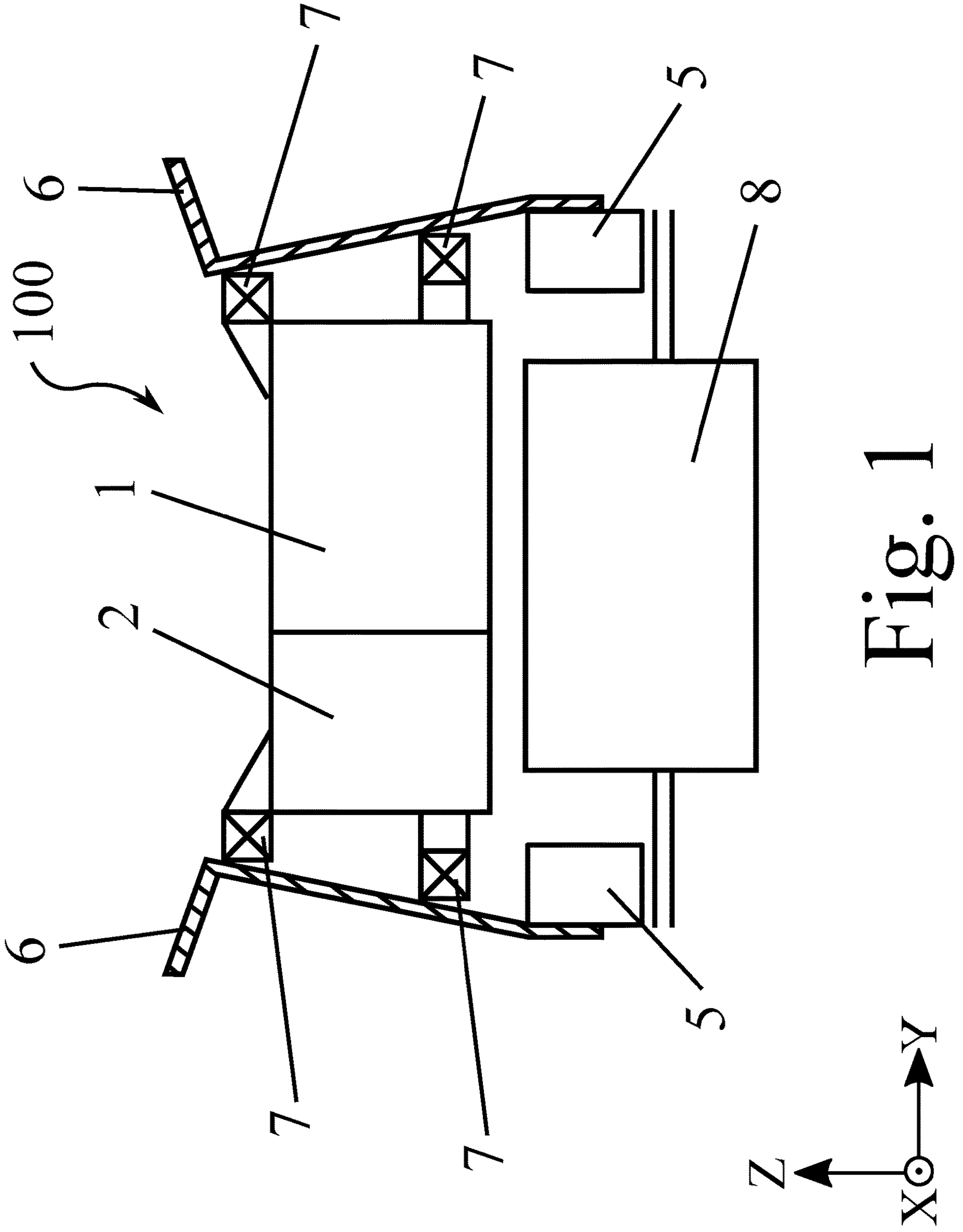
FIG. 1 schematically shows a front-end vehicle structure according to an embodiment, viewed from a motor vehicle longitudinal direction.
Figure 2:
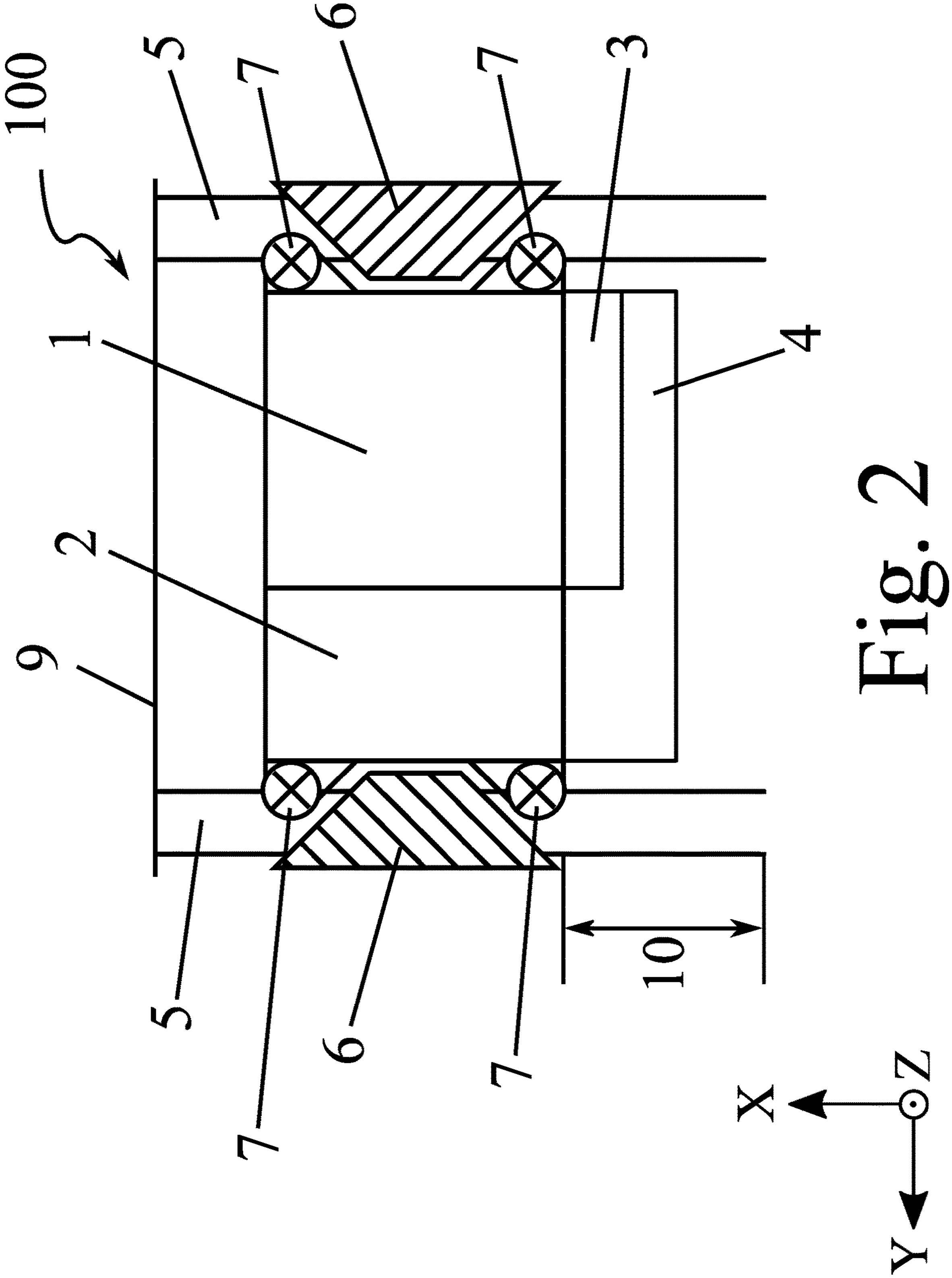
FIG. 2 schematically shows the front-end vehicle structure from FIG. 1, viewed from a motor vehicle vertical direction.

The front-end vehicle structure 100 of the motor vehicle according to the embodiment is schematically illustrated in FIGS. 1 and 2.

The front-end vehicle structure 100 has a fuel cell system 1, a DC/DC converter 2, an anode system 3, a fuel cell system periphery 4, two longitudinal motor supports 5, two suspension strut domes 6, four mounting points 7, an electric motor 8, and a bulkhead 9.

A Cartesian coordinate system is moreover illustrated in FIGS. 1 and 2, which has an X-axis extending in the motor vehicle longitudinal direction, a Y-axis extending in the motor vehicle width direction, and a Z-axis extending in the motor vehicle vertical direction. The motor vehicle longitudinal direction X presently extends from a front to a rear of the motor vehicle.

The bulkhead 9 in the motor vehicle longitudinal direction X separates a motor vehicle interior (not illustrated) of the motor vehicle from the front-end vehicle structure 100.

Proceeding from the bulkhead 9, the two longitudinal motor supports 5, which are disposed opposite one another in the motor vehicle longitudinal width direction Y, extend toward the front in the motor vehicle longitudinal direction X, i.e. in the direction of the front of the motor vehicle.

Proceeding from the two longitudinal motor supports 5, one suspension strut extends in each case upward in the motor vehicle vertical direction Z, wherein each of the suspension struts at the upper end thereof has one of the two suspension strut domes 6. The two suspension strut domes 6, like the longitudinal motor supports 5, are disposed opposite one another in the motor vehicle width direction Y.

The fuel cell system 1, the DC/DC converter 2, and the electric motor 8 are disposed in front of the bulkhead 9 in the motor vehicle longitudinal direction X.

The fuel cell system 1 as well as the DC/DC converter 2 are disposed between the suspension strut domes 6 in the motor vehicle width direction Y, and disposed so as to be level with the suspension strut domes 6 in the motor vehicle longitudinal direction X.

A housing of the DC/DC converter 2, conjointly with the fuel cell system 1, forms a self-support structure which extends over an entire length between the four mounting points 7 in the motor vehicle width direction Y.

Two of the mounting points 7 are presently configured on the suspension strut domes 6, and the other two mounting points 7 are configured on the respective spring support. Additionally or alternatively, the fuel cell system 1 and the DC/DC converter 2 can be mounted on one of the longitudinal motor supports 5 or on both longitudinal motor supports 5.

The DC/DC converter 2 is disposed so as to be level with the fuel cell system 1 in the motor vehicle longitudinal direction X and in the motor vehicle vertical direction Z, and is disposed beside the fuel cell system 1 in the motor vehicle width direction Y.

The electric motor 8 is disposed in the installation space resulting from this arrangement, below the fuel cell system 1 and the DC/DC converter 2.

A so-called crash-relevant region 10, which is contemplated in such a way that it can deform in the event of a frontal crash of the motor vehicle, commences in front of the two suspension strut domes 6 in the motor vehicle longitudinal direction X.

Since the fuel cell system 1, the DC/DC converter 2, and the electric motor 8 are disposed so as to be level with the suspension strut domes 6 in the motor vehicle longitudinal direction X, these components are not disposed in the crash-relevant region 10 and are not impinged by a force in the frontal crash.

The anode system 3 and the fuel cell system periphery 4 are disposed in the crash-relevant region 10, i.e. in front of the fuel cell system 1, the DC/DC converter 2 and the electric motor 8 in the motor vehicle longitudinal direction X. In this way, the anode system 3 as well as the fuel cell system periphery 4 are thus substantially freely accessible from the front in the motor vehicle longitudinal direction.

LIST OF REFERENCE SIGNS

- 1 Fuel cell system
- 2 DC/DC converter
- 3 Anode system
- 4 Fuel cell system periphery
- 5 Longitudinal motor support
- 6 Suspension strut dome
- 7 Mounting point
- 8 Electric motor
- 9 Bulkhead
- 10 Crash-relevant region
- 100 Front-end vehicle structure
- X Motor vehicle longitudinal direction
- Y Motor vehicle width direction
- Z Motor vehicle vertical direction

What is claimed is:

1. A front-end vehicle structure of a motor vehicle, comprising:

a bulkhead;

a fuel cell system; and a DC/DC converter;

wherein the DC/DC converter is disposed next to the fuel cell system in a motor vehicle width direction, and is disposed so as to be level with the fuel cell system in a motor vehicle vertical direction and in the motor vehicle longitudinal direction, wherein the fuel cell system and the DC/DC converter are disposed in front of the bulkhead in a motor vehicle longitudinal direction, and wherein the DC/DC converter, in the motor vehicle longitudinal direction, is disposed so as to be level with the fuel cell system.

2. The front-end vehicle structure according to claim 1, further comprising:

two suspension strut domes which are disposed opposite one another in the motor vehicle width direction, wherein (i) the fuel cell system is disposed between the suspension strut domes in the motor vehicle width direction, and/or is disposed so as to be level with the suspension strut domes in the motor vehicle longitudinal direction, and/or (ii) the DC/DC converter is disposed between the suspension strut domes in the motor vehicle width direction, and/or is disposed so as to be level with the suspension strut domes in the motor vehicle longitudinal direction.

3. The front-end vehicle structure according to claim 1, wherein a housing of the DC/DC converter, conjointly with the fuel cell system, forms a self-supporting structure.

4. The front-end vehicle structure according to claim 3, wherein the self-supporting structure extends over an entire length between the suspension strut domes in the motor vehicle width direction.

5. The front-end vehicle structure according to claim 1, further comprising:

a fuel cell system periphery which is disposed in front of the fuel cell system and/or the DC/DC converter in the motor vehicle longitudinal direction.

6. The front-end vehicle structure according to claim 5, further comprising:

an anode system which is disposed in front of the fuel cell system and/or the DC/DC converter in the motor vehicle longitudinal direction.

7. The front-end vehicle structure according to claim 1, further comprising:

an anode system which is disposed in front of the fuel cell system and/or the DC/DC converter in the motor vehicle longitudinal direction.

8. The front-end vehicle structure according to claim 1, wherein the fuel cell system and the DC/DC converter are mounted on the front-end vehicle structure, on one or both of the suspension strut domes.

9. The front-end vehicle structure according to claim 1, wherein the front-end vehicle structure has two longitudinal motor supports which are disposed opposite one another in the motor vehicle width direction, and the fuel cell system and the DC/DC converter are mounted on one or both of the longitudinal motor supports.

10. The front-end vehicle structure according to claim 1, further comprising:

an electric motor which, in the motor vehicle vertical direction, is disposed below the fuel cell system and/or the DC/DC converter.

11. The front-end vehicle structure according to claim 2, wherein the fuel cell system and the DC/DC converter are disposed outside a crash-relevant region which lies in front of the suspension strut domes in the motor vehicle longitudinal direction.

12. The front-end vehicle structure according to claim 5, wherein the fuel cell system periphery is disposed in a crash-relevant region in front of the fuel cell system and the DC/DC converter.

13. The front-end vehicle structure according to claim 5, wherein the fuel cell system periphery is disposed between a cooler and a module consisting of the DC/DC converter and the fuel cell system.

14. The front-end vehicle structure according to claim 5, wherein the fuel cell system periphery comprises a drive apparatus with a compressor.

15. The front-end vehicle structure according to claim 1, wherein the fuel cell system and the DC/DC converter are acoustically decoupled from a bodywork of the motor vehicle.

16. The front-end vehicle structure according to claim 10, wherein the electric motor is disposed in a region between the suspension strut domes.

17. The front-end vehicle structure according to claim 2, wherein each suspension strut dome is a reinforced convexity in a wheel arch of an integral bodywork of the motor vehicle, and wherein a bearing for a suspension strut is situated at an apex of the convexity.

18. The front-end vehicle structure according to claim 3, further comprising: four mounting points, wherein two of the mounting points are configured on the suspension strut domes.

19. The front-end vehicle structure according to claim 7, wherein the anode system is accessible from a front of the motor vehicle in the motor vehicle longitudinal direction.

20. The front-end vehicle structure according to claim 1, wherein the bulkhead separates a passenger cabin from a motor bay of the motor vehicle below a windshield.

* * * * *